(12) United States Patent
Bendigeri et al.

(10) Patent No.: US 11,166,289 B2
(45) Date of Patent: Nov. 2, 2021

(54) INTERFERENCE-BASED SWITCHING

(71) Applicant: Dell Products, L.P., Round Rock, TX (US)

(72) Inventors: Udaya Surendra Bendigeri, Austin, TX (US); Kamal Joseph Koshy, Austin, TX (US); Vivek Viswanathan Iyer, Austin, TX (US); Dileep Kumar Soma, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 60 days.

(21) Appl. No.: 16/774,731

(22) Filed: Jan. 28, 2020

(65) Prior Publication Data

US 2021/0235460 A1    Jul. 29, 2021

(51) Int. Cl.
| | |
|---|---|
| *H04W 4/00* | (2018.01) |
| *H04W 72/08* | (2009.01) |
| *H04W 84/12* | (2009.01) |
| *H04B 17/318* | (2015.01) |
| *H04W 4/02* | (2018.01) |
| *H04W 4/80* | (2018.01) |

(52) U.S. Cl.
CPC ........ *H04W 72/082* (2013.01); *H04B 17/318* (2015.01); *H04W 4/023* (2013.01); *H04W 4/80* (2018.02); *H04W 72/085* (2013.01); *H04W 84/12* (2013.01)

(58) Field of Classification Search
CPC ..... H04W 72/082; H04W 4/80; H04W 4/023; H04W 72/085; H04W 84/12; H04B 17/318

USPC ........................................................ 370/329
See application file for complete search history.

(56) References Cited

U.S. PATENT DOCUMENTS

| | | | |
|---|---|---|---|
| 10,397,039 B2 * | 8/2019 | Zhang ................. | H04B 17/309 |
| 2014/0293829 A1 * | 10/2014 | Visuri ............... | H04M 15/8351 |
| | | | 370/254 |
| 2014/0370929 A1 * | 12/2014 | Khawand ............ | H04W 52/367 |
| | | | 455/522 |
| 2016/0044692 A1 * | 2/2016 | Egner .................... | H04L 5/006 |
| | | | 370/330 |
| 2016/0183317 A1 * | 6/2016 | Shao ...................... | H04W 4/80 |
| | | | 709/227 |
| 2016/0262067 A1 * | 9/2016 | Hara .................... | H04W 36/36 |

(Continued)

OTHER PUBLICATIONS

Z. Weng, et al., "Classification of Wireless Interference on 2.4GHz Spectrum," TR2014-018, Apr. 2014, 8 pages, Mitsubishi Electric Research Laboratories, Inc., Cambridge, Massachusetts, USA.

*Primary Examiner* — Marceau Milord
(74) *Attorney, Agent, or Firm* — Fogarty LLP

(57) ABSTRACT

Systems and methods for interference-based switching are described. In some embodiments, an Information Handling System (IHS) may include a processor and a memory coupled to the processor, the memory having program instructions stored thereon that, upon execution, cause the IHS to: while connected to a first communication channel provided by a first access point, detect wireless interference in a second communication channel provided by a second access point; score the second access point, at least in part, based upon the wireless interference; and switch from the first communication channel to the second communication channel, at least in part, based upon the score.

19 Claims, 4 Drawing Sheets

(56) References Cited

U.S. PATENT DOCUMENTS

| | | |
|---|---|---|
| 2017/0019370 A1* | 1/2017 | Ravinoothala ........ H04L 61/103 |
| 2017/0230871 A1* | 8/2017 | Rangaswamy ... H04W 36/0033 |
| 2018/0234902 A1* | 8/2018 | Talbert .................. H04W 24/02 |
| 2019/0007354 A1* | 1/2019 | Bulut ..................... G16H 40/63 |
| 2019/0014024 A1 | 1/2019 | Koshy |
| 2019/0020530 A1* | 1/2019 | Au ......................... H04L 5/0057 |
| 2019/0158340 A1* | 5/2019 | Zhang ................... H04B 17/318 |
| 2019/0245810 A1 | 8/2019 | Gulbay et al. |
| 2020/0182995 A1* | 6/2020 | Zeng ..................... G01S 13/723 |

* cited by examiner

INTERFERENCE-BASED SWITCHING

FIELD

This disclosure relates generally to Information Handling Systems (IHSs), and more specifically, to systems and methods for interference-based switching.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate through networks to perform processing tasks. Generally, client IHSs establish communication through a network to a server IHS to retrieve and store information. Different types of networks support different types of communication at different data transfer rates. For example, a client IHS may communicate with a local area network (LAN) through a wired Ethernet communication, such as through a CAT 5 cable, through a USB or other serial cable, or through a variety of wireless communication protocols, such as a wireless local area network (WLAN) or a wireless wide area network (WWAN). In an enterprise or residential network, client IHSs access networks through access points, such as with wireless or Ethernet interfaces (e.g., an Internet router interface).

When equipped with a wireless communication interface, an IHS performs scanning operations to determine a suitable access point (AP) or base station to which the IHS may connect. During an active scan, an IHS periodically transmits a probe request and listens for a probe response from the AP or base station. With a passive scan, the IHS listens on each channel for beacons sent periodically by the AP or base station.

As the inventors hereof have recognized, modern IHSs do not directly account for the electromagnetic interference that a particular communication channel may be subject to, prior to switching to that channel. For example, an IHS does not check the amount of interference in the 2.4 GHz spectrum prior to switching from a 5 GHz channel to a 2.4 GHz channel, which degrades a user's experience. To address these, and other problems, the inventors hereof have developed systems and methods for interference-based switching.

SUMMARY

Embodiments of systems and methods for interference-based switching are described. In an illustrative, non-limiting embodiment an Information Handling System (IHS) may include a processor and a memory coupled to the processor, the memory having program instructions stored thereon that, upon execution, cause the IHS to: while connected to a first communication channel provided by a first access point, detect wireless interference in a second communication channel provided by a second access point; score the second access point, at least in part, based upon the wireless interference; and switch from the first communication channel to the second communication channel, at least in part, based upon the score.

For example, the first and second communication channels may be WiFi channels. The first communication channel may include a 5 GHz or a 2.4 GHz channel, and wherein the second communication channel may include a 2.4 GHz channel.

To detect the wireless interference, the program instructions, upon execution, may cause the IHS to use a Bluetooth interface. To score the second access point based upon the wireless interference, the program instructions, upon execution, may cause the IHS to use at least one of: Received Signal Strength Indicator (RSSI) data or Time-of-Flight (ToF) data.

Additionally, or alternatively, to score the second access point based upon the wireless interference, the program instructions, upon execution, may cause the IHS to attribute a weight to the wireless interference based upon context information. In some cases, the context information may include an application under execution, and the weight may be a first weight in response to the application being a first application or a second weight in response to the application being a second application.

Additionally, or alternatively, the context information may include an IHS posture, and the weight may be a first weight in response to the IHS posture being a first posture or a second weight in response to the IHS posture being a second posture. Additionally, or alternatively, the context information may include a distance between a user and the IHS, and the weight may be a first weight in response to the user being at a first distance from the IHS or a second weight in response to the user being at a second distance from the IHS. Additionally, or alternatively, the context information may include motion information, and the weight may be a first weight in response to the IHS moving at a first speed or in a first direction or a second weight in response to the IHS moving at a second speed or in a second direction. Additionally, or alternatively, the context information may include an indication of whether the IHS is inside or outside of a bag, and the weight may be a first weight in response to the IHS being inside the bag or a second weight in response to the IHS being outside the bag.

In another illustrative, non-limiting embodiment, a memory device may have program instructions stored thereon that, upon execution by an IHS, cause the IHS to: while connected to a first communication channel provided by a first access point, detect wireless interference in a second communication channel provided by a second access point; score the second access point, at least in part, based upon the wireless interference; and switch from the first communication channel to the second communication channel, at least in part, based upon the score.

The first and second communication channels may be WiFi channels, the first communication channel may include a 5 GHz or a 2.4 GHz channel, and the second communication channel may include a 2.4 GHz channel. To detect the wireless interference, the program instructions, upon execution, may cause the IHS to use a Bluetooth interface. To score the second access point based upon the wireless interference, the program instructions, upon execution, may cause the IHS to use at least one of: Received Signal Strength Indicator (RSSI) data or Time-of-Flight (ToF) data.

In yet another illustrative, non-limiting embodiment, a method may include: while connected to a first communication channel provided by a first access point, detecting wireless interference in a second communication channel provided by a second access point; scoring the second access point, at least in part, based upon the wireless interference, wherein the weight is selected based upon context information; and switching from the first communication channel to the second communication channel, at least in part, based upon the score.

The context information may include an application under execution, and the weight may be a first weight in response to the application being a first application or a second weight in response to the application being a second application. Additionally, or alternatively, the context information may include an IHS posture, and the weight may be a first weight in response to the IHS posture being a first posture or a second weight in response to the IHS posture being a second posture. Additionally, or alternatively, the context information may include a distance between a user and the IHS, and the weight may be a first weight in response to the user being at a first distance from the IHS or a second weight in response to the user being at a second distance from the IHS. Additionally, or alternatively, the context information may include motion information, and the weight may be a first weight in response to the IHS moving at a first speed or in a first direction or a second weight in response to the IHS moving at a second speed or in a second direction.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Systems and methods for interference-based switching are described. In various embodiments, these systems and methods may update access point (AP) selection(s) based upon interference measurements and/or context.

In an enterprise environment, when a user is in a café or meeting room, for example, there may be electromagnetic interference from other Bluetooth (e.g., Bluetooth Low-Energy or "BTLE"), wireless cameras devices, legacy devices, microwave devices, etc. on the 2.4 GHz channel. This interference can create higher packet error rates, lower throughput, increased number of retries, etc., resulting in sub-optimal user experience that conventional AP scoring techniques cannot identify.

In contrast with the conventional approach, systems and methods described herein may score or quantify the amount of interference in the 2.4 GHz channel prior to making a switching operation (e.g., current 5 GHz spectrum link), in addition to using other Key Performance Indicators (KPIs) or Quality-of-Service (QoS) indicators. By also taking into account the interference in 2.4 GHz spectrum coming from various sources, these systems and methods may make more intelligent decisions before switching to an otherwise polluted 2.4 GHz spectrum.

In some embodiments, systems and methods described herein may employ an adaptive algorithm based on interference measurements to select the best network or communication link amongst the available networks, thus improving the user's experience. Moreover, context information obtained by an IHS may be used to adaptively modify the weights of these interference measurements as part of a switching decision.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
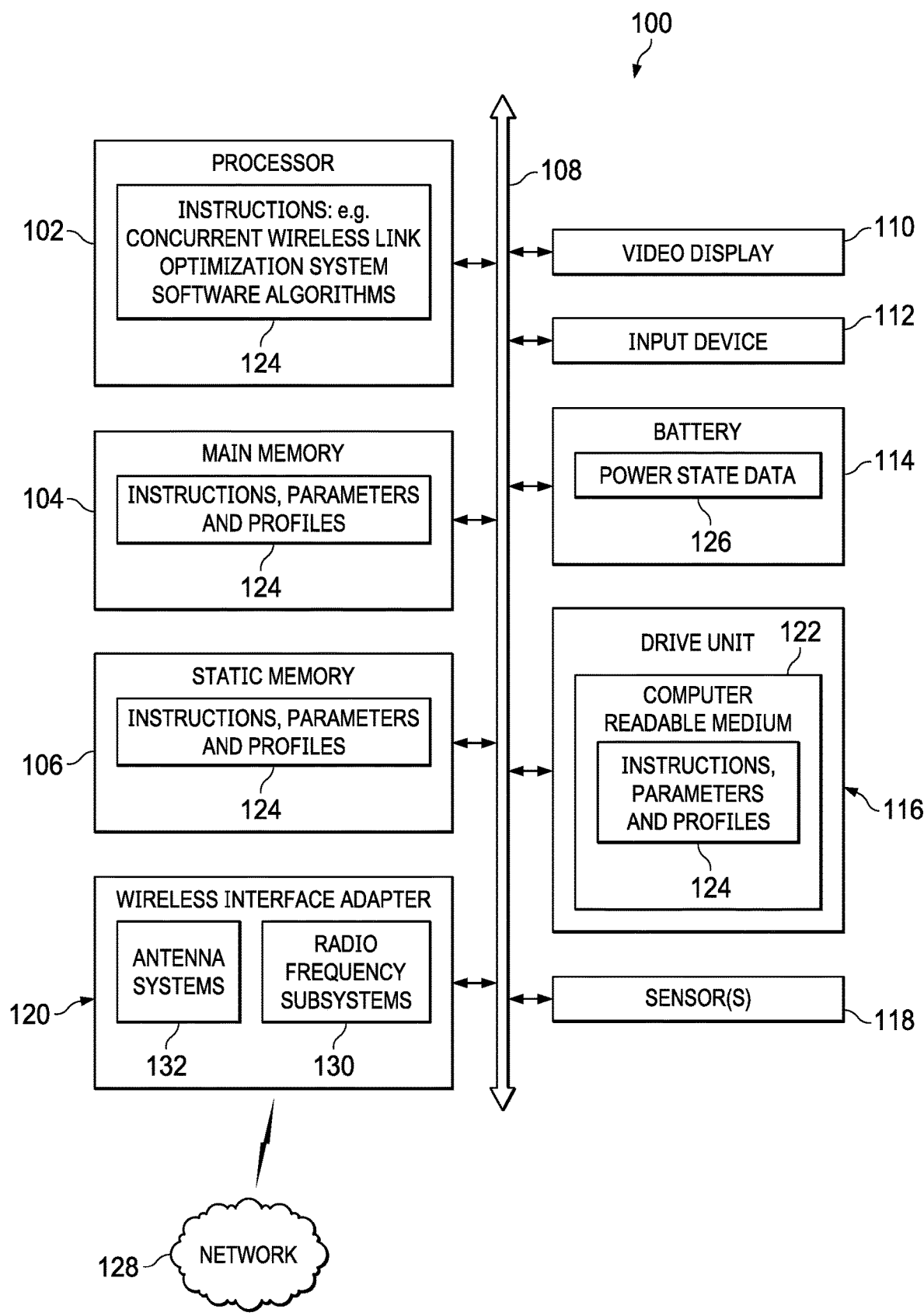
FIG. 1 is block diagram of an example of components of an Information Handling System (IHS) configured to implement interference-based switching, according to some embodiments.

FIG. 1 is block diagram of an example of components of an Information Handling System (IHS) configured to implement interference-based switching. In some embodiments IHS 100 may represent wireless communication devices 210, 220, and 230 or servers or systems 290 located anywhere within network 200 of FIG. 2, including remote data center 286.

Generally speaking, IHS 100 may represent a wireless communication device (e.g., a phone, a tablet, a watch, a laptop, etc.) associated with a user or recipient of intended wireless communication. The wireless communication device may execute instructions via a processor for a context aware radio resource management system including an interference-based switching system. The context aware radio resource management or interference-based switching system may operate as a software agent, in whole or in part, on the wireless communication device. IHS 100 may also represent a networked server or other system and administer aspects of the context aware radio resource management system including an interference-based switching system via instructions executed on a processor.

As shown in FIG. 1, IHS 100 may include processor 102 such as a central processing unit (CPU), a graphics processing unit (GPU), or both. Moreover, IHS 100 can include main memory 104 and a static memory 106 that can communicate with each other via bus 108. As shown, IHS 100 may further include video display unit 110, such as a liquid crystal display (LCD), an organic light emitting diode (OLED), a flat panel display, a solid-state display, or other type of display system. Display 110 may include a touch screen display module and touch screen controller (not shown) for receiving user inputs to IHS 100. In some implementations, two displays may be coupled to each other via a hinge or the like.

Additionally, IHS 100 may include input device 112, such as a keyboard, and a cursor control device, such as a mouse or touchpad or similar peripheral input device. IHS 100 may also include a power source such battery 114 or an A/C power source. IHS 100 may also include disk drive unit 116 and sensor(s) 118. IHS 100 may include a network interface device such as wireless adapter 120. IHS 100 may also represent a server device whose resources can be shared by multiple client devices, or it can represent an individual client device, such as a desktop personal computer, a laptop computer, a tablet computer, or a mobile smartphone.

IHS 100 may include program instructions 124 that can be executed by processor 102 to cause the computer system to perform any one or more of the methods or operations disclosed herein. For example, instructions 124 may execute a scanning and algorithm among a plurality of local area networks/communication links, including concurrent wireless access between local area network components or clients, software agents, or other aspects or components. Similarly, instructions 124 may establish aggregated multiple wireless links and resources within local area network access points and client.

In some implementations, Wi-Fi scanning may be performed with a defined (or adjusted) time interval and occurring frequency either while IHS 100 is connected to a 5G base station or a WiFi AP. For instance, WiFi scanning may be performed to find out ToF/RSSI value for each available WiFi AP, including the current AP and other nearby WiFi APs. WiFi scanning results may be stored during a defined storing interval (e.g., only the very previous results or more) for a contingency plan in case of danger zone (current connection is in danger) or dead zone (neither 5G nor WiFi).

With respect to 5G scanning, the scanning across multiple 5G base stations to yield a recommendation of best 5G base station among nearby 5G base stations may be performed by the 5G network itself, such that the connection to that 5G base station may be automatically configured by 5G network. In other cases, however, IHS 100 may also track link quality data (e.g., ToF and RSSI values) for each 5G base station nearby, measured by IHS 100 and/or reported by a base station.

In some cases, instructions 124 may be executed for performing variable scan interval in one or more wireless communication bands or other communication links such as WLAN, WiGig, Ethernet or the like. Additionally, or alternatively, instructions 124 may be executed for regulating aggregated transmission or reception along wireless channels or other channels within a local area network setting selected but which may occupy nearby, both physically and in frequency, wireless link channels.

Various software modules comprising program instructions 124 may be coordinated by an OS via an application programming interface (API). Examples of OSs may include WINDOWS, ANDROID, and other OS types known in the art. Examples of APIs include, but are not limited to: Win 32, Core Java API, or Android APIs. In a further example, processor 102 may conduct monitoring and processing of wireless communication device usage trends by IHS 100.

In a networked deployment, IHS 100 may operate in the capacity of a server or as a client user computer in a server-client user network environment, or as a peer computer system in a peer-to-peer (or distributed) network environment. IHS 100 may also be implemented as or incorporated into various devices, such as a personal computer (PC), a tablet PC, a set-top box (STB), a PDA, a mobile IHS, a palmtop computer, a laptop computer, a desktop computer, a communications device, a wireless telephone, a land-line telephone, a control system, a camera, a scanner, a facsimile machine, a printer, a pager, a personal trusted device, a web appliance, an access point, a network router, switch or bridge, or any other machine capable of executing a set of instructions (sequential or otherwise) that specifies actions to be taken by that machine.

Disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. Disk drive unit 116 and static memory 106 also contain space for data storage. Further, instructions 124 may embody one or more of the methods or logic as described herein.

Wireless link quality or conditions may be monitored and measured by processor 102 during wireless link usage and stored. In a particular embodiment, instructions, parameters, and profiles 124 may reside completely, or at least partially, within main memory 104, static memory 106, and/or disk drive 116 during execution by processor 102. Main memory 104 and processor 102 may also include computer-readable media. Battery 114 may include a smart battery system that tracks and provides power state data 126. This power state data may be stored with instructions, parameters, and profiles 124.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency (RF) subsystems 130 with transmitter/receiver circuitry, wireless controller circuitry, amplifiers and other circuitry for wireless communications. Each RF subsystem 130 may communicate with one or more wireless technology protocols. RF subsystem 130 may contain individual subscriber identity module (SIM) profiles for each technology service provider and their available protocols. Alternatively, it may have a software-based SIM profile that is reconfigurable, or an eSIM for electronic control over activate SIM profile being used. Wireless adapter 120 may also include antenna system 132 which may include tunable antenna systems.

In some cases, wireless adapter 120 may operate two or more wireless communication links. For example, wireless adapter 120 may operate the two or more wireless communication links with a single, shared communication frequency band such as with the 5G standard relating to unlicensed wireless spectrum for small cell 5G next gen operation or for unlicensed WiFi WLAN operation. For instance, a 5 GHz wireless communication frequency band may be apportioned under the 5G standards for communication on either small cell WWAN wireless link operation or WiFi WLAN operation. In another example, wireless adapter 120 may operate a wireless communication link or links in unlicensed spectrum in 4.5G using protocols such as Licensed Assisted Access (LAA) or enhanced LAA (eLAA). In some embodiments, shared or aggregated wireless communication link(s) may be transmitted through one or a plurality of antennas.

In other cases, IHS 100 operating as a wireless communication device may operate a plurality of wireless adapters 120 for concurrent radio operation in one or more wireless communication bands. The plurality of wireless adapters 120 may further share a wireless communication band in some disclosed embodiments.

Wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Wireless adapter 120 may represent an add-in card, wireless network interface module that is integrated with a main board of HIS 100 or integrated with another wireless network interface capability, or any combination thereof.

In an embodiment, wireless adapter 120 may include one or more RF subsystems 130 including transmitters and wireless controllers for connecting via a multitude of wireless links. IHS 100 may have an antenna system transmitter 132 for 5G small cell WWAN, WiFi WLAN or WiGig connectivity and one or more additional antenna system transmitters 132 for macro-cellular communication. RF subsystems 130 include wireless controllers to manage authentication, connectivity, communications, power levels for transmission, buffering, error correction, baseband processing, and other functions of wireless adapter 120.

RF subsystems 130 of wireless adapter 120 may measure various metrics relating to wireless communication pursuant to operation of a context aware radio resource management system. For example, the wireless controller of RF subsystem 130 may manage detecting and measuring received signal strength levels, bit error rates, signal to noise ratios, latencies, packet loss, congestion, contention, jitter, interference, and other metrics or indicators relating to signal quality and strength. In an embodiment, a wireless controller may manage one or more RF subsystems 130 within wireless adapter 120.

The wireless controller also manages transmission power levels which directly affect RF subsystem power consumption. To detect and measure power consumption by RF subsystem 130, RF subsystem 130 may implement current and voltage measurements of power.

The wireless network may have a wireless mesh architecture in accordance with mesh networks described by the wireless data communications standards or similar standards. Wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In accordance with various embodiments, a computer-readable medium may include instructions, parameters, and profiles 124 or it may receive and execute instructions, parameters, and profiles 124 responsive to a propagated signal; so that a device connected to network 128 can communicate voice, video, or data over network 128. Further, program instructions 124 may be transmitted or received over the network 128 via the network interface device or wireless adapter 120.

IHS 100 includes one or more application programs 124, and Basic Input/Output System and firmware (BIOS/FW) code 124. BIOS/FW code 124 functions to initialize IHS 100 on power up, to launch an operating system, and to manage input and output interactions between the operating system and the other elements of IHS 100. In an embodiment, BIOS/FW code 124 reside in memory 104, and include machine-executable code that is executed by processor 102 to perform various operations of IHS 100. In another embodiment, application programs and BIOS/FW code reside in another storage medium of IHS 100. For example, application programs and BIOS/FW code can reside in drive 116, in a ROM associated with IHS 100, in an option-ROM associated with various devices of IHS 100, in storage system 107, in a storage system associated with network channel of a wireless adapter 120, in another storage medium of IHS 100, or a combination thereof. Application programs 124 and BIOS/FW code 124 can each be implemented as single programs, or as separate programs carrying out the various operations described herein.

In some embodiments, a computer-readable medium may include a solid-state memory such as a memory card or other package that houses one or more non-volatile read-only memories. Further, a computer-readable medium may be a random-access memory or other volatile re-writable memory. Additionally, a computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment.

Sensors 118 may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, angle, deformation, bending, direction, movement, velocity, rotation, acceleration, bag state (in or out of a bag), and/or lid sensor(s) (open or closed). In some cases, one or more sensors 118 may be a part of a keyboard or other input device 112. Processor 102 may be configured to process information received from sensors 118 and to perform interference-based switching.

For instance, during operation, the user may open, close, flip, swivel, or rotate display 110 to produce different IHS postures. In some cases, processor 102 may be configured to determine a current posture of IHS 100 using sensors 118. For example, in a dual-display IHS implementation, when a first display 110 (in a first IHS portion) is folded against a second display 110 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For each posture and/or hinge angle, processor(s) 201 may perform a different interference-based switching operation.

For example, in a laptop posture, a first display surface of a first display 110 may be facing the user at an obtuse angle with respect to a second display surface of a second display 110 or a physical keyboard portion. In a tablet posture, a first display 110 may be at a straight angle with respect to a second display 110 or a physical keyboard portion. And, in a book posture, a first display 110 may have its back resting against the back of a second display 110 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

Moreover, a different interference-based switching operation may be performed based on other context information such as the presence or distance of the user with respect to IHS 100 and/or display 110. In these cases, processor 102 may process user presence data received by sensors 118 and may determine, for example, whether an IHS's end-user is present or absent.

In situations where the end-user is present before IHS 100, processor 102 may further determine a distance of the end-user from IHS 100 continuously or at pre-determined time intervals. The detected or calculated distances may be used by processor 102 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 110.

More generally, in various implementations, processor 102 may receive IHS context information using sensors 118 including one or more of, for example: user's presence state (e.g., present, near-field, mid-field, far-field, absent), IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, etc.

In various embodiments, IHS 100 may not include all of the components shown in FIG. 1. Additionally, or alternatively, IHS 100 may include components in addition to those shown in FIG. 1. Additionally, or alternatively, components represented as discrete in FIG. 1 may be integrated with other components. For example, all or a portion of the functionality provided by the illustrated components may be implemented in a System-On-Chip (SOC), or the like.

Figure 2:
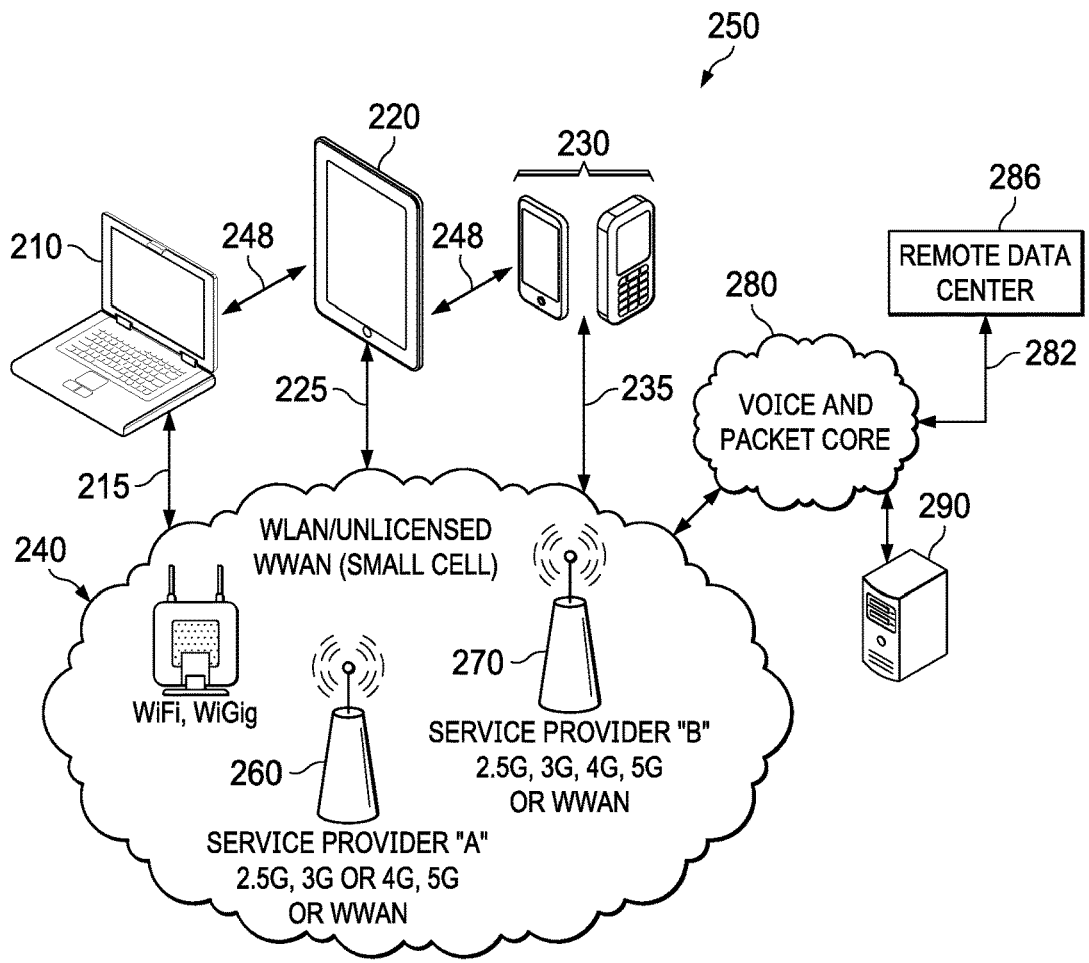
FIG. 2 is block diagram of a network environment where systems and methods for interference-based switching may be implemented, according to some embodiments.

FIG. 2 is a block diagram of network environment 200 where systems and methods for interference-based switching may be implemented. In some embodiments, network 200 may include networked wireless communication devices 210, 220, and 230, wireless network access points, and multiple wireless connection link options. Network 200 may include one or more wired communication devices or links. For example, communication device 210 may include a wired link, such as an Ethernet link. A variety of additional computing resources of network 200 may include client mobile information handling systems, data processing servers 290, network storage devices, local and wide area networks, or other resources as needed or desired.

As depicted, IHSs 210, 220, and 230 may be a laptop computer, tablet computer, or smartphone device. Wireless communication devices 210, 220, and 230 may access a wireless local network 240, or they may access a macro-cellular network 250. In a further example, IHS 230, such as a laptop, may alternatively access local network 240 using a wired link, such as a wired Ethernet connection. In an example, the wireless local network 240 may be the wireless local area network (WLAN), a wireless personal area network (WPAN), or a wireless wide area network (WWAN).

In an embodiment, a standalone mobile IHS 210, 220, or 230 may operate on WLAN such as WiFi or on unlicensed WWAN small cell wireless links such as with small cell unlicensed LTE substations in wireless local network 240. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 WiFi, IEEE 802.11ad WiGig, IEEE 802.15 WPAN, or emerging 5G small cell WWAN communications such as eNodeB, or similar wireless network protocols.

Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like.

In some embodiments, networked wireless communication devices 210, 220, or 230 may have a plurality of wireless network interface systems capable of transmitting simultaneously within a shared communication frequency band. Communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Examples of competing protocols may be local wireless network access protocols such as WiFi, WiGig, and small cell WLAN in an unlicensed, shared communication frequency band. Examples of communication frequency bands may include unlicensed 5 GHz frequency bands or 2.5 GHz conditional shared communication frequency bands under FCC Part 96. WiFi ISM frequency bands that could be subject to future sharing include 2.4 GHz, 60 GHz, 900 MHz or similar bands.

Voice and packet core network 280 may contain externally accessible computing resources and connect to a remote data center 286. Voice and packet core network 280 may contain multiple intermediate web servers or other locations with accessible data. Voice and packet core network 280 may also connect to other wireless networks similar to 240 or 250 and additional wireless communication devices such as 210, 220, 230 or similar connected to those additional wireless networks.

Connection 282 between wireless network 240 and remote data center 286 or connection to other additional wireless networks may be via Ethernet or another similar connection to the world-wide-web, a WAN, a LAN, another WLAN, or other network structure. Connection 282 may be made via a WLAN access point/Ethernet switch to the external network and be a backhaul connection.

The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In various implementations, cloud or remote data center 286 or networked server 290 may run hosted applications for systems 210, 220, and 230. For example, remote data center 286, networked server 290, or some combination of both may operate some or all of a plurality of hosted applications. Wireless communication devices 210, 220, and 230 may be configured to run one or more applications locally, and to have hosted applications run in association with the local applications at remote data center 286 or networked server 290. For example, wireless communication devices 210, 220, and 230 may operate some or all of the hosted applications on a remote server via local area network connectivity.

Thus, as illustrated, systems 210, 220, and 230 may be running applications locally while requesting data objects related to those applications from the remote data center 286 via a wireless network. For example, a data storage client application such as Microsoft Sharepoint may run on system 220, and it may be associated with a host application running at remote data center 286 that represents a Sharepoint data storage server. In another example, a web browser application may be operating at system 230, and it may request web data from a host application that represents a hosted website and associated applications running at remote data center 286.

Although 215, 225, and 235 are shown connecting wireless adapters of wireless communication devices 210, 220, and 230 to wireless networks 240 or 250, actual wireless communication may link through a wireless access point (WiFi or WiGig), through unlicensed WWAN small cell base stations such as in network 240 or through a service provider tower such as that shown with service provider A 260 or service provider B 270 and in network 250.

In other cases, wireless communication devices 210, 220, and 230 may communicate intra-device via 248 when one or more of wireless communication devices 210, 220, and 230 are set to act as an access point or a WWAN connection via small cell communication or licensed small cell WWAN connections. For example, one of wireless communication devices 210, 220, and 230 may serve as a WiFi hotspot.

Quality-of-Service (QoS), bandwidth, time-of-flight (e.g., following the Fine Time Measurement or "FTM" protocol), and/or speed of wireless links 215, 225, and 235—that is, a link's capabilities—may vary widely depending on several factors including the service provider, the number of wireless communication devices and users in a location, and other factors. Thus, selection of a wireless link among local area network links such as WLAN links may depend on assessment of the link radio frequency conditions. The wireless communication device's operating context can play an important role in determining wireless link conditions. Information about wireless link connection quality and capacity for a service to be used can be advantageous in optimizing interference-based switching.

Often the QoS of an end-to-end wireless communication path between wireless communication devices of a user and a recipient will most directly be affected the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Factors impacting energy consumption include switching and signaling during communication access, setup, and authentication. Additional factors that impact energy consumption include control communications, latencies, transmission/reception, and switching for the wireless link. These factors can be specific to the type of wireless service being requested, whether voice, messaging, SMTP, Audio, Video, HTTP or other service types. They can also be specific to the wireless communication device used. In each instance, radio frequency transmission subsystems and controllers operate and consume device power. Based on these, and other factors, systems and methods described herein may automatically perform interference-based switching to optimize radio frequency conditions, traffic conditions, device power consumption, cost, etc.

Figure 3:
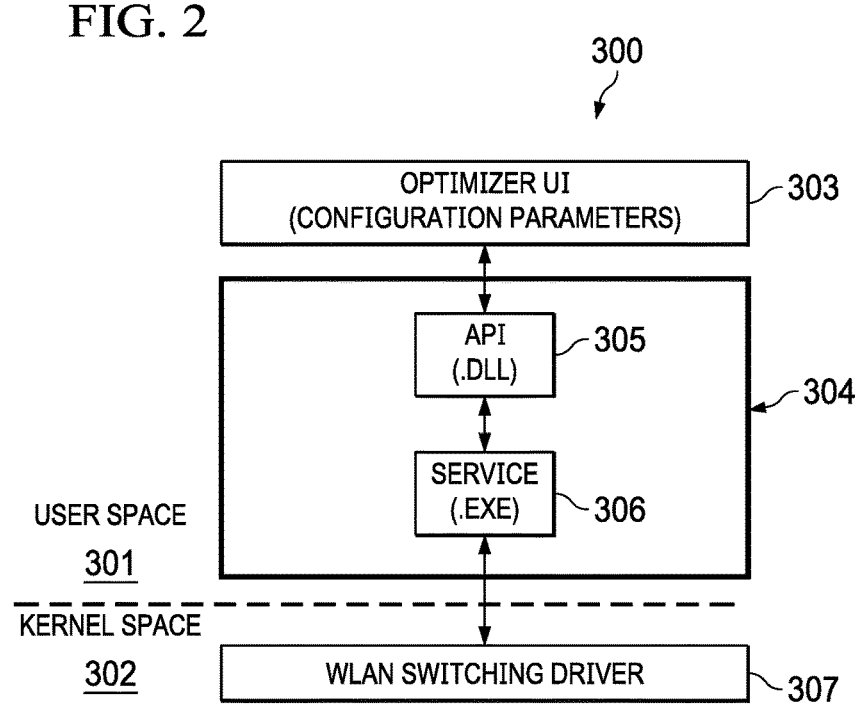
FIG. 3 is a block diagram of software modules configured to implement interference-based switching, according to some embodiments.

FIG. 3 is a block diagram of software modules 300 configured to implement interference-based switching. In some embodiments, software 300 may be instantiated through the execution of program instructions 124 by processor 102 of IHS 100 and configured execute method 500 shown in FIG. 5. As shown, optimizer user interface (UI) 303 may provide a graphical UI (GUI) in user space 301 configured to receive one or more configuration parameters. For example, optimizer UI 303 may receive, as configuration parameters, a user's selection of QoS indicator(s), threshold(s), and/or context information (e.g., application type, proximity-based, posture-based, etc.), usable by software 300 to determine when to enable, disable, and/or (re)configure interference-based switching features in IHS 100.

Optimizer UI passes configuration parameters to OS plug-in module 304, which includes API 305 (a dynamic-link library or DLL, etc.) and OS service 306 (e.g., an executable). In some implementations, OS service 306 may be configured to handle variable scanning features in user space 301. In kernel space 302, callout driver 307 (e.g., Windows Filtering Platform (WFP)) may be configured to perform interference-based switching operations under control of OS service 306, according to the configuration parameters received via optimizer UI 303.

In some implementations, software 300 may include machine learning (ML) and/or artificial intelligence (AI) algorithms configured to collect context information such as, for example, RSSI from various APs, ToF from various APs, physical location information (e.g., by GPS), accelerometer data, etc. Software 300 may also include ML and/or AI algorithms configured to store and analyze other context information indicative of user behavior, such applications under execution and their priorities, distance between the user and the IHS, IHS posture or hinge angle, bag status, etc. Moreover, software 300 may be configured to use such information to perform interference-based switching that is specific to that context.

Figure 4:
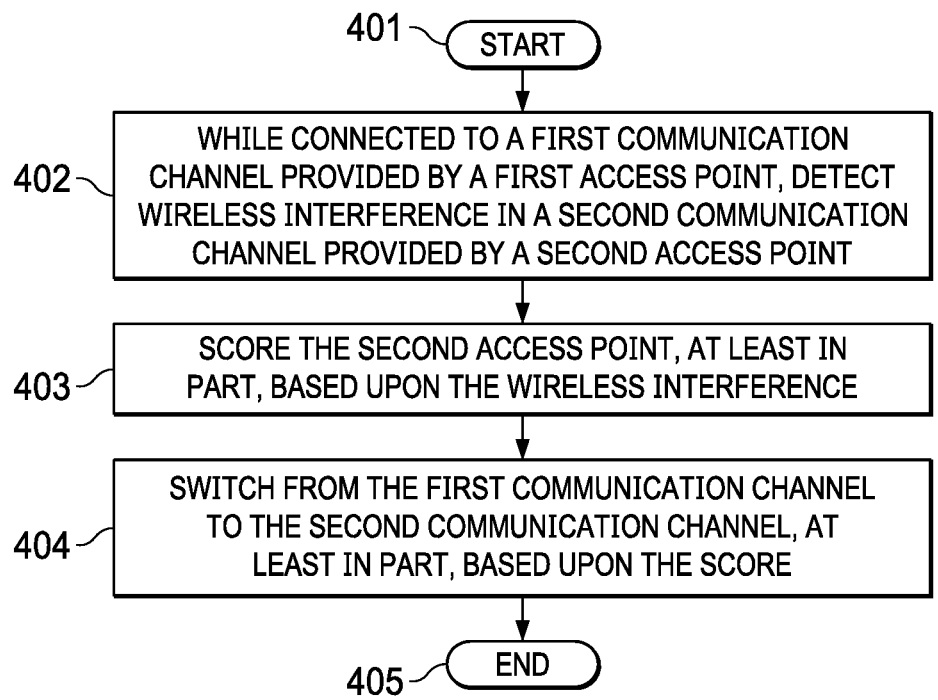
FIG. 4 is a flowchart of an example of a method for interference-based switching, according to some embodiments.

FIG. 4 is a flowchart of an example of method 400 for interference-based switching. In some embodiments, method 400 may be performed by IHS 100 in response to program instructions 124 being executed by processor 102. Particularly, method 400 begins at block 401. At block 402, while IHS 100 is connected to a first communication channel provided by a first AP, method 400 detects wireless interference in a second communication channel provided by a second AP.

For example, the first and second communication channels may be WiFi channels, the first communication channel may be a 5 GHz or a 2.4 GHz spectrum channel, and the second communication channel may be a 2.4 GHz spectrum channel. In these cases, IHS 100 may use an existing BT module and antenna system to measure an amount of BT interference present in the 2.4 GHz spectrum.

At block 403, method 400 may score the second AP, at least in part, based on wireless interference. For example, the scoring of a 2.4 GHz AP may be given by: alpha *wlan_2.4_ghz_AP_Score, where "wlan_2.4_ghz_AP_Score" is an AP score calculated using Received Signal Strength Indicator (RSSI) data, Time-of-Flight (ToF) data, and/or other parameters, and where alpha is a weight having a value between 0.0 to 1.0 proportional to the amount of BT interference loading on the 2.4 GHz channel.

In some cases, once the weight is calculated for given amount of measured BT interference, that weight may be modified based upon on context. For example, the weight may be modified into a given weight in response to an application under execution by IHS 100 being a given application or another weight in response to the application being another application. Additionally, or alternatively, the weight may be modified into a given weight in response to an IHS posture being a given posture or another weight in response to the IHS posture being another posture. Additionally, or alternatively, the weight may be modified into a given weight in response to the user being at a given distance from the IHS or another weight in response to the user being at another distance from the IHS. Additionally, or alternatively, the weight may be modified into a given weight in response to the IHS moving at a given speed or in a given direction or another weight in response to the IHS moving at another speed or in another direction. Additionally, or alternatively, the weight may be modified into a given weight in response to the IHS being inside a bag or another weight in response to the IHS being outside the bag. The specific values of each weight may be determined via ML/AI algorithms using prior context information and historical data indicating the success (or improvement) when switching between 5 GHz and 2.4 GHz channels under the same or similar amount of interference in different contexts.

At block 404, method 400 may switch from the first communication channel to the second communication channel, at least in part, based upon the score. For example, the score may be compared against a threshold value, and if the score is equal to or smaller than that value, the switching operation takes place. Additionally, or alternatively, if two or more APs are being scored, the AP with the lowest score may be selected.

Figure 5:
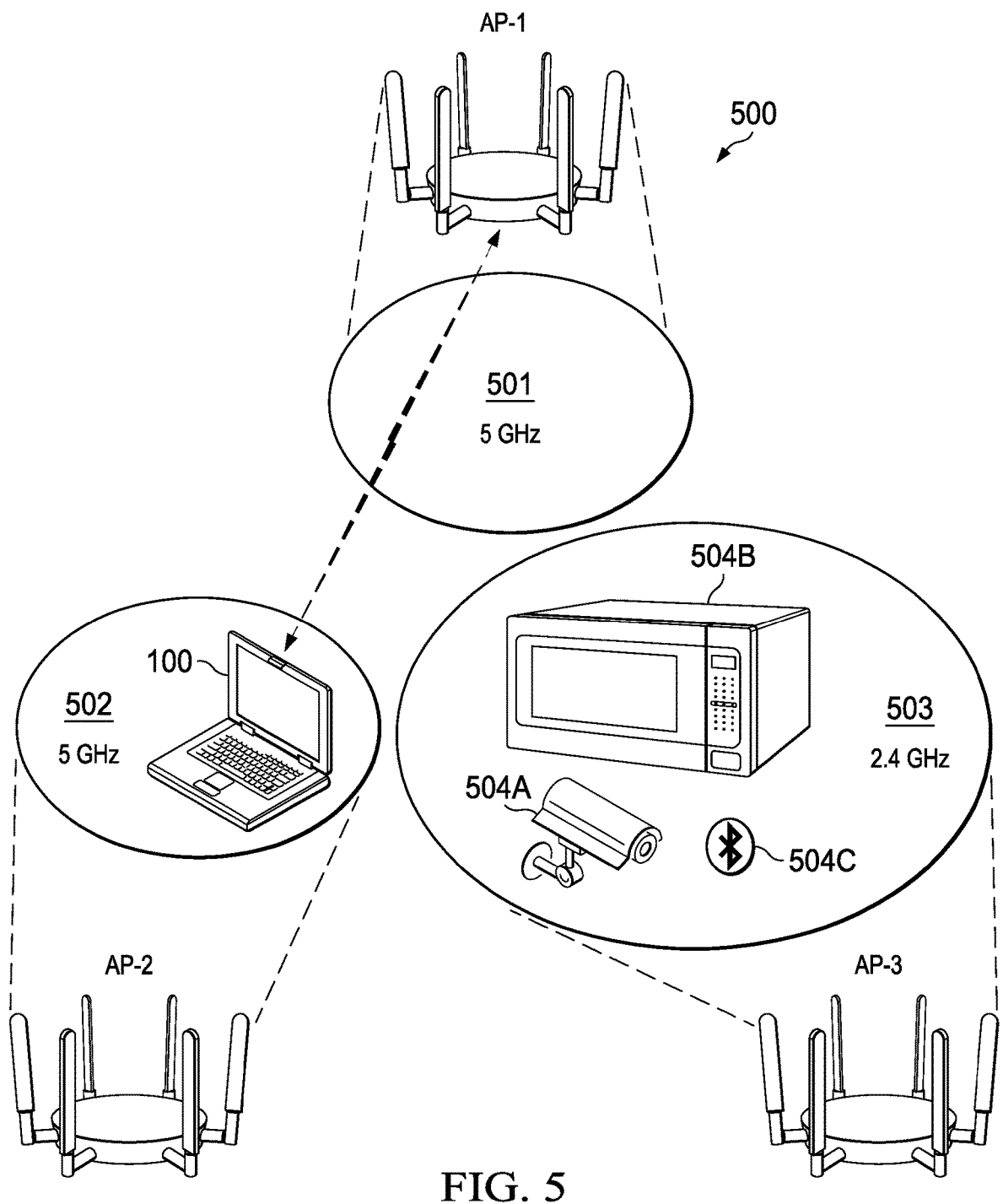
FIG. 5 is a diagram of an example use-case of interference-based switching, according to some embodiments.

FIG. 5 is a diagram of an example use-case 500 of interference-based switching. In use-case 500, IHS 100 presently coupled to AP-2 in WiFi coverage area 502 using a 5 GHz spectrum channel. AP-1 provides WiFi coverage area 501 in the 5 GHz spectrum, and AP-3 provides WiFi coverage area 503 in the 2.4 GHz spectrum.

If IHS 100 moves and/or loses its connection to AP-1, IHS 100 may decide to switch over to AP-2 or AP-3. As part of that assessment, IHS 100 may compare scores for each available AP. Moreover, IHS 100 may perform method 400 to take into account the effect of BT interference from devices 504A-C on the 2.4 GHz channel of AP-3 prior to comparing the two AP's scores.

For instance, in this use-case, AP-1 may be scored as a "6" and AP-3 may be scored as a "5" absent application of method 400. Upon application of method 400, however, once interference is taken into account, AP-1 may continue to be scored as a "6," but AP-3 may be scored as a "7." In the former case AP-3 would be selected, and in the latter case AP-1 would be selected.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
while connected to a first communication channel provided by a first access point, detect wireless interference in a second communication channel provided by a second access point;
score the second access point, at least in part, based upon the wireless interference;
switch from the first communication channel to the second communication channel, at least in part, based upon the score; and
attribute a weight to the wireless interference based upon context information comprising at least one of an IHS posture in which the IHS comprises a laptop computer, a distance between a user and the IHS, or an indication of whether the IHS is inside or outside of a bag.

2. The IHS of claim 1, wherein the first and second communication channels are WiFi channels.

3. The IHS of claim 2, wherein the first communication channel comprises a 5 GHz or a 2.4 GHz channel, and wherein the second communication channel comprises a 2.4 GHz channel.

4. The IHS of claim 1, wherein to detect the wireless interference, the program instructions, upon execution, further cause the IHS to use a Bluetooth interface.

5. The IHS of claim 1, wherein to score the second access point based upon the wireless interference, the program instructions, upon execution, further cause the IHS to use at least one of: Received Signal Strength Indicator (RSSI) data or Time-of-Flight (ToF) data.

6. The IHS of claim 1, wherein the context information comprises an application under execution, and wherein the weight is a first weight in response to the application being a first application or a second weight in response to the application being a second application.

7. The IHS of claim 1, wherein the context information comprises the IHS posture, and wherein the weight is a first weight in response to the IHS posture being a first posture or a second weight in response to the IHS posture being a second posture.

8. The IHS of claim 1, wherein the context information comprises the distance between a user and the IHS, and wherein the weight is a first weight in response to the user being at a first distance from the IHS or a second weight in response to the user being at a second distance from the IHS.

9. The IHS of claim 1, wherein the context information comprises motion information, and wherein the weight is a first weight in response to the IHS moving at a first speed or in a first direction or a second weight in response to the IHS moving at a second speed or in a second direction.

10. The IHS of claim 1, wherein the context information comprises the indication of whether the IHS is inside or outside of a bag, and wherein the weight is a first weight in response to the IHS being inside the bag or a second weight in response to the IHS being outside the bag.

11. A memory device having program instructions stored thereon that, upon execution by an Information Handling System (IHS), cause the IHS to:
while connected to a first communication channel provided by a first access point, detect wireless interference in a second communication channel provided by a second access point;
score the second access point, at least in part, based upon the wireless interference;
switch from the first communication channel to the second communication channel, at least in part, based upon the score; and
attribute a weight to the wireless interference based upon context information comprising at least one of an IHS posture in which the IHS comprises a laptop computer, a distance between a user and the IHS, or an indication of whether the IHS is inside or outside of a bag.

12. The memory device of claim 11, wherein the first and second communication channels are WiFi channels, wherein the first communication channel comprises a 5 GHz or a 2.4 GHz channel, and wherein the second communication channel comprises a 2.4 GHz channel.

13. The memory device of claim 11, wherein to detect the wireless interference, the program instructions, upon execution, further cause the IHS to use a Bluetooth interface.

14. The memory device of claim 11, wherein to score the second access point based upon the wireless interference, the program instructions, upon execution, further cause the IHS to use at least one of: Received Signal Strength Indicator (RSSI) data or Time-of-Flight (ToF) data.

15. A method, comprising:
while connected to a first communication channel provided by a first access point, detecting wireless interference in a second communication channel provided by a second access point;
scoring the second access point, at least in part, based upon the wireless interference;
switching from the first communication channel to the second communication channel, at least in part, based upon the score; and
attribute a weight to the wireless interference based upon context information comprising at least one of an IHS posture in which the IHS comprises a laptop computer, a distance between a user and the IHS, or an indication of whether the IHS is inside or outside of a bag.

16. The method of claim 15, wherein the context information comprises an application under execution, and wherein the weight is a first weight in response to the application being a first application or a second weight in response to the application being a second application.

17. The method of claim 15, wherein the context information comprises the IHS posture, and wherein the weight is a first weight in response to the IHS posture being a first posture or a second weight in response to the IHS posture being a second posture.

18. The method of claim 15, wherein the context information comprises the distance between a user and the IHS, and wherein the weight is a first weight in response to the user being at a first distance from the IHS or a second weight in response to the user being at a second distance from the IHS.

19. The method of claim 15, wherein the context information comprises motion information, and wherein the weight is a first weight in response to the IHS moving at a first speed or in a first direction or a second weight in response to the IHS moving at a second speed or in a second direction.

* * * * *